United States Patent [19]

Brooke

[11] 4,371,904
[45] Feb. 1, 1983

[54] FLEXIBLE MAGNETIC DISK SYSTEM

[75] Inventor: Raymond Brooke, Woodland Hills, Calif.

[73] Assignee: Pertec Computer Corporation, Los Angeles, Calif.

[21] Appl. No.: 180,326

[22] Filed: Aug. 22, 1980

[51] Int. Cl.³ ............................................ G11B 21/10
[52] U.S. Cl. .................................................... 360/77
[58] Field of Search ........................... 360/77, 133, 135

[56] References Cited

U.S. PATENT DOCUMENTS

| | | | |
|---|---|---|---|
| 3,924,268 | 12/1975 | McIntosh et al. | 360/77 |
| 4,016,603 | 4/1977 | Ottesen | 360/135 |
| 4,032,984 | 6/1977 | Kaser et al. | 360/77 |
| 4,188,646 | 2/1980 | Sordello et al. | 360/77 |

OTHER PUBLICATIONS

Jahnke, "Track-Locating . . . File", IBM Tech. Disc. Bull., vol. 23, No. 2, Jul. 1980, p. 738.

*Primary Examiner*—Robert S. Tupper
*Attorney, Agent, or Firm*—Freilich, Hornbaker, Wasserman, Rosen & Fernandez

[57] ABSTRACT

A simple flexible magnetic disk memory system is provided which enables precise positioning of a read/write head to follow a data track, despite non-uniform expansion or contraction of the disk. Several positioning sectors of the disk are formed which have positioning tracks recorded thereon, and several corresponding holes are punched in the disk to enable an optical sensor to determine the sector locations. Although a step motor positions a head at the approximate middle of a selected data track, an analog circuit repeatedly adjusts the head location as each positioning sector passes the head. Four positioning sectors can be used which are each aligned with or angled by 90° from the direction of machining of the sheet material of which the disk was made, to minimize track run-out in each data region that lies between positioning sectors.

8 Claims, 7 Drawing Figures

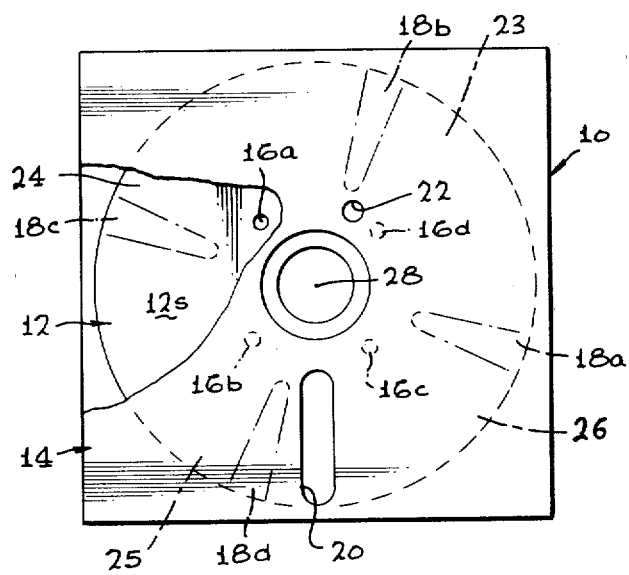
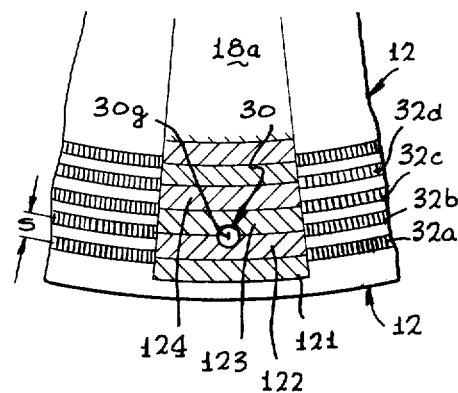
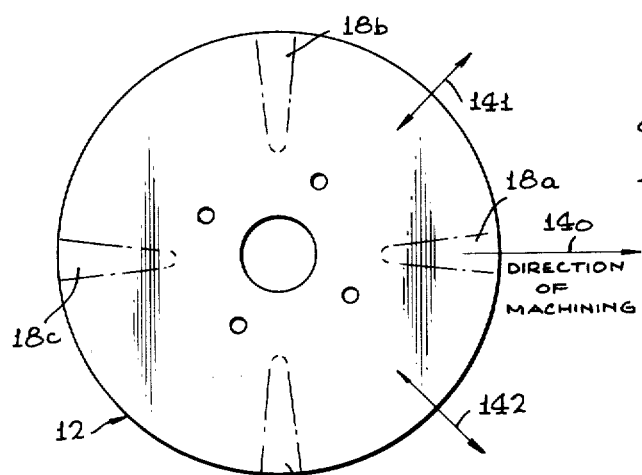
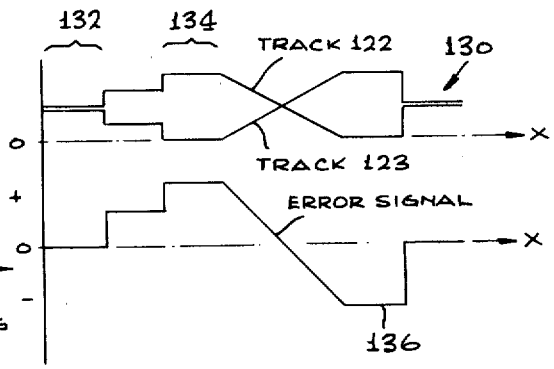
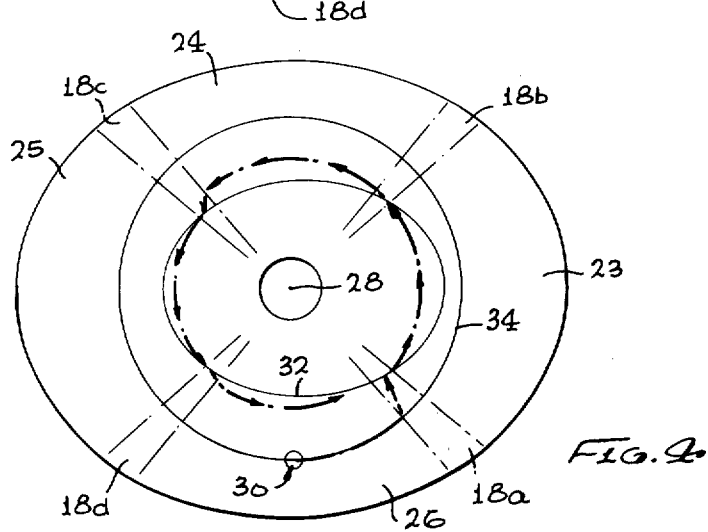
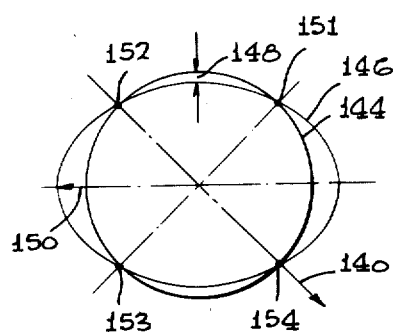

FLEXIBLE MAGNETIC DISK SYSTEM

BACKGROUND OF THE INVENTION

Replaceable low cost flexible disks contain concentric tracks which may be spaced apart by a distance such as 20 mil (thousandths of an inch). Although higher track density would increase the total capacity of the disk, an important limitation on track density is imposed by expansion and contraction of the plastic substrate material of the disk. Two major factors in dimensional changes are hygroscopic (water absorption) and thermal expansion of the substrate, the latter being anisotropic (direction dependent). In addition, time dependent anisotropic deformations of the disk occur which further limit the maximum attainable track density. A relatively simple flexible magnetic disk memory system which compensates for dimensional changes, including anistropic changes, would facilitate the reliable utilization of higher track densities and therefore higher total data capacities of flexible disks.

SUMMARY OF THE INVENTION

In accordance with one embodiment of the present invention, a flexible magnetic memory disk system is provided which partially compensates for changes in the dimensions of the flexible disk to thereby enable the use of higher track densities. Several sectors of the disk have positioning tracks recorded thereon, and several corresponding holes are punched in the disk to enable an optical sensor to determine the sector locations. Whenever a head is riding over a positioning sector, the radial position of the head is adjusted so as to center the head on a data track which extends between the positioning sectors.

The positioning sectors can be positioned with respect to the "direction of machining" of the substrate from which the disk was formed, to minimize the effects of anisotropic deformations of the disk. In one embodiment of the invention, four positioning sectors are spaced 90° about the disk, and with each positioning sector positioned in line with the direction of machining of the substrate or angled 90° therefrom. The direction of machining is typically the direction along which the plastic substrate was fed through rolls, in the production of the sheet from which the disk was punched.

The novel features of the invention are set forth with particularity in the appended claims. The invention will be understood from the following description when read in conjunction with the accompanying drawings.

BRIEF DESCRIPTION OF THE DRAWINGS

FIG. 1 is a plan view of a flexible disk cartridge constructed in accordance with the present invention;

FIG. 2 is a plan view of the disk of the cartridge of FIG. 1;

FIG. 3 is a plan view of a portion of the disk of FIG. 2;

FIG. 4 is a plan view of the disk of FIG. 2, showing in exaggerated fashion, the manner in which the position of a head is adjusted by the use of positioning sectors of the disk;

FIG. 6 comprises a graph showing signals generated in the system of FIG. 5 which cause adjustment of head position; and FIG. 7 is a diagrammatic view showing how the location of the positioning tracks with respect to the direction of machining minimizes runout of the tracks.

DESCRIPTION OF THE PREFERRED EMBODIMENT

Figure 5:
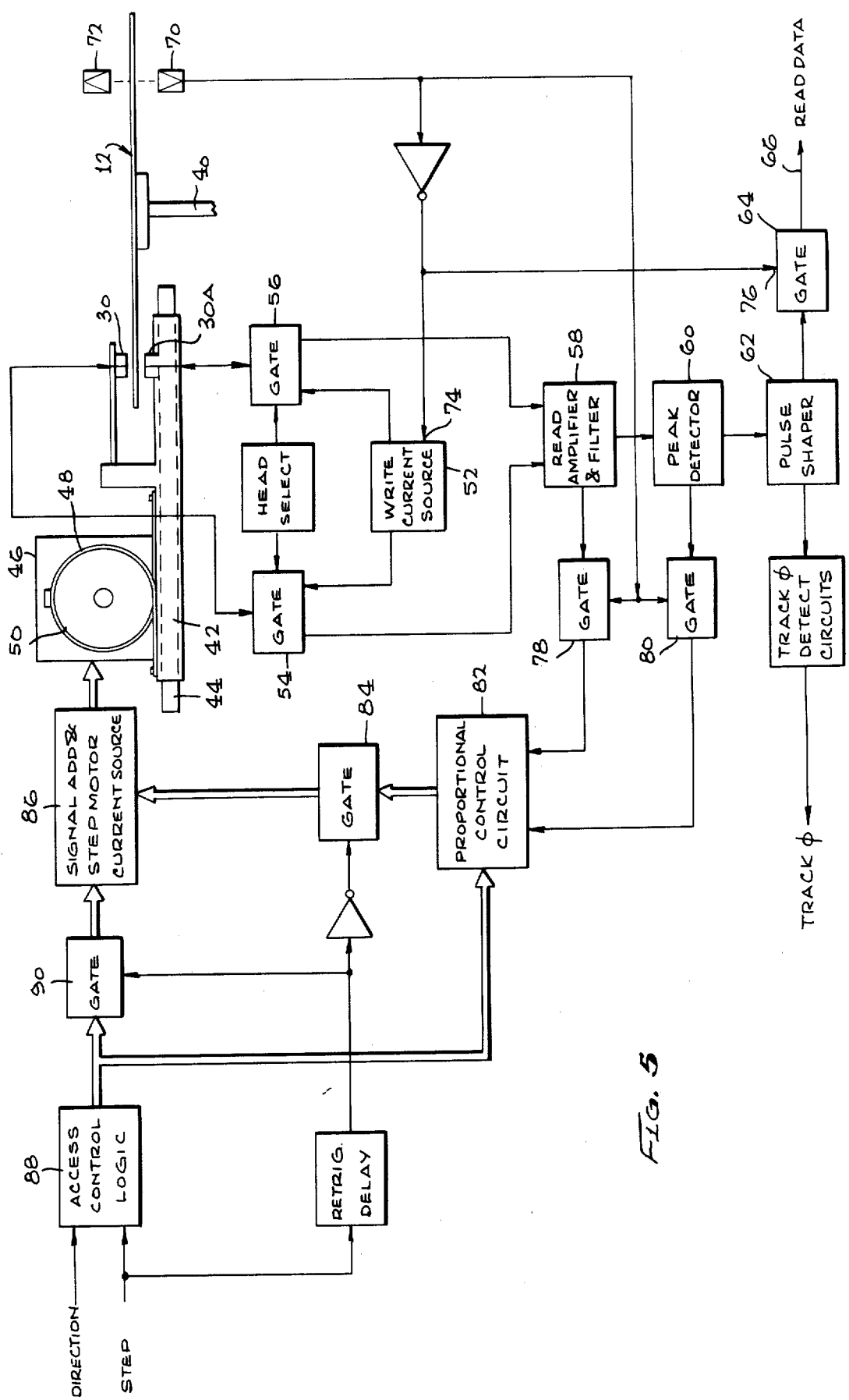
FIG. 5 is a block diagram of a flexible disk drive system constructed in accordance with the present invention.

FIG. 1 illustrates a flexible disk cartridge 10 of the present invention, which includes a flexible disk 12 lying within a jacket 14. The disk 12 can be formed of a circle of flexible plastic material such as Mylar having a layer of magnetic material on either surface thereof, which is similar to prior art disks. However, the disk 12 is provided with four sector-locating holes 16a–16d punched into the disk, and also includes four positioning sectors 18a–18d corresponding to the holes. Each positioning sector includes a series of positioning tracks recorded onto the disk. The jacket 14, within which the disk can rotate, includes a a normal head access opening 20, and also includes an index-detecting hole 22. Most of the surface 12s of the disk is occupied by data regions 23–26, which lie between the positioning sectors 18a–18d, and with the data regions carrying information recorded along tracks extending concentric with the axis 28 of the disk.

If each of the circular data tracks (which are interrupted by the four positioning sectors 18) were truly concentric with the axis 28 of the disk, then the data tracks could be located very close to one another, to provide a large data storage capacity on the disk. However, expansion and contraction of the disk can occur, and such dimensional change may be greater in one direction than in another direction. Such anisotropic expansion can arise from moisture absorption, thermal expansion, and time dependent changes. Such dimensional changes, and particularly those which are anisotropic are important limiting factors on the track density of flexible disks. If information is recorded along a predetermined track that may be concentric with the axis 28 of the disk, and if anisotropic expansion occurs prior to a later read out of information from that track, then the head utilized during read out will not be centered on the track at all times. If the read out head is far from the center of the track, the signal strength will decrease, and in an extreme case the head could read data from another adjacent track. This possibility limits the track density.

In a system of the present invention, the read head, shown at 30 in FIG. 4, is able to follow, to a large extent, changes in the radial distance of a data track 32 from the axis of rotation at 28 of the disk. In the exaggerated view of FIG. 4, it is assumed that the data track 32 was originally recorded as a circle 34 concentric with the axis of rotation, but due to anistropic shrinkage the track has assumed an eliptical configuration and is offset from the axis 28. Initially, the disk drive will position the head 30 on the original circular track 34. However, when a first positioning sector 18a is reached by the head, the position of the head will be adjusted until it is coincident with the data track 32. The head will then follow a circular path until it reaches the next positioning sector 18b, where another slight adjustment will be made to position the head directly on the data track 32. At every 90° rotation of the disk, the position of the head will again be slightly adjusted to be coincident with the data track. During the time when the head 30 lies over a positioning sector such as 18a, data is not recorded on or read from (except for positioning track information) the disk, inasmuch as all data is contained only in the data regions 23-26 which lie between the positioning sectors.

FIG. 5 illustrates details of a flexible disk drive apparatus which permits the head to easily follow the track. The disk 12 (shown without its jacket) is rotated on a spindle 40 while a pair of heads 30, 30A are positioned substantially against the surfaces of the disk to record or read a track area of the disk. The heads are positioned on a carriage 42 that can slide along a carriage guide 44, and which can be moved along the guide by a step motor 46. A metal band drive 48 connects a Capstan 50 on the motor shaft to the carriage.

When data is to be recorded onto the disk, the data is passed from a write current source 52 through gates 54, 56 to the heads 30, 30A. When information is to be read from the disk, the outputs of the heads are delivered through the gates 54, 56, amplifier 58, peak detector 60 and pulse shaper 62, and through a gate 64 to a data output line 66. The read and write operations can occur only when a disk position sensor 70 does not detect one of the holes 16a -16d in the disk which indicate that a position sector lies under the heads. The sensor 70 is a photo diode which is illuminated with light from a light emitting diode 72.

When a hole in the disk lies over the position sensor 70 so that the sensor 70 is illuminated, the signal from the sensor is delivered to a terminal 74 of the write current source 52 to prevent writing to thus protect the information in the positioning sectors. Also, a signal is delivered to the input 76 of the read output gate 64 to prevent the delivery of false information over the data output line 66. The signal from the sensor 70 is further delivered to a pair of gates 78, 80 to open them, so that signals read by the heads 30, 30A, and which have been amplified by amplifier 58 or peak detected by detector 60, can be delivered to a proportional control circuit 82. The proportional control circuit 82 delivers an analog signal through a gate 84 to a motor current source 86 to adjust the current to the motor 46 so as to slightly adjust the position of the carriage 42 and therefore of the heads 30, 30A to better follow a track on the disk.

The motor current source 86 is controlled to step the carriage between different tracks, by an access control logic circuit 88 which delivers its output through a gate 90 to the motor current source. The signals delivered by the logic circuit 88 to the motor current source 86 are designed to step the motor to position the head at any one of a group of predetermined track positions. For example, a disk may include seventy-seven different tracks, at a density of 48 tracks per inch, so that the tracks are spaced by approximately twenty-one mil (thousandths of an inch) apart. In this case the control logic 88 is then designed to drive the motor source 86 to advance the carriage by an integral number of times the 21 mil track spacing, to position the heads approximately at the centers of the desired tracks (if there were no disk expansion or contraction). However, every time a positioning sector comes under the heads 30, 30A, the proportional control circuits 82 provide an additional signal to further move the motor by a small amount to correct for deviation of the actual track from the nominal track position. The slight adjustment of carriage position can be readily accomplished utilizing known stepper motor microprocessing techniques.

FIG. 3 illustrates one way in which a group of positioning tracks 121-124 recorded in a positioning sector 18a of the disk can be utilized to adjust the position of a head 30 to more closely center the head on a data track such as 32a -32d. Alternate positioning tracks such as 122 and 123 are recorded to produce different signals in the head 30. For example, the two tracks 122,123 can be encoded with continuous signals but of different frequencies, and demodulator channels connected to the head can then include appropriate band pass filters followed by envelope detectors. FIG. 6 contains a graph 130 showing the relative amplitude of signals arising from the two adjacent tracks such as 122 and 123 which the head 30 is reading due to the head gap 30g lying over marginal regions of both tracks. The signal levels at 132 are equal when the gap of the read head extends equally over both tracks. The signal levels at 134 represent the relative contributions when the head lies over track 122 and not over any portion of track 123. The graph 136 represents the error signal resulting from substracting the amplitude of the signal arising from track 122 from the signal arising from track 123. The error signal is zero only when the head lies equally over both tracks. The proportional control circuit 82 of FIG. 5 can generate a signal proportional to the error signal 136 to slightly adjust the radial position of the heads until the error signal is zero. When the error signal is zero, the head 30 of FIG. 3 will leave the positioning sector 18a at a position wherein it is precisely centered on the track 32b.

The data tracks 32a -32d etc. are radially spaced by a nominal spacing S, and the positioning tracks are similarly spaced although they are offset from adjacent data tracks 32. The radial adjustment which the positioning tracks produce, will normally be much less than the nominal spacing S of the tracks. The positioning sector 18a is utilized in initially writing the data along the track 32b, as well as in later positioning the head to read the track 32b. The positioning tracks 121-124 etc. can be recorded by the manufacturer of the disk.

While it is possible to partially compensate for expansion and contraction of the disk by shifting the read/write heads several times during each revolution of the disk, it is desirable to minimize the amplitude of such shifts. The disk 12 can be formed from a sheet of plastic such as Mylar by punching it out of the sheet. The sheet and the disk formed from it will not expand and contract equally in all directions. Tests on Mylar disks as described in *Dimensional Stability of "Floppy Disks"*, by Greenberg et al., IEEE Transactions on Magnetics, September 1977, have shown that deformation due to stress relaxation occurs primarily perpendicular to the direction of machining, while thermal deformation appears to occur at about 45° to the direction of machining. Where the disk is annealed, so that stress relaxation is not predominant, the difference in expansion is greatest between a direction 141 (FIG. 2) which is angled +45° to the direction of machining shown at 140 and a direction 142 perpendicular to line 141. The direction of machining 140 is typically the direction in which the sheet of plastic material was passed between rollers which reduced it to a predetermined size. In order to minimize the amount of head position adjustment which must be made, the positioning sectors 18a and 18c are oriented along the direction of machining, while sectors 18b and 18d are oriented perpendicular thereto.

FIG. 7 shows how anisotropic expansion or contraction of a disk can alter the configuration of a track 144 which was originally circular, into an idealized distorted configuration 146 which is oval. The greatest deviation of the oval track 146 from the circular configuration occurs at 148 and 150, while the minimal deviation occurs approximately at the locations 151-154 which are angled 45° from these locations 148, 150 of maximum deviation. Thus, by making the head adjustments at the locations 151-154, minimal adjustments will have to be made, and the deviation from the head moving on the circle 144 to the oval track will be minimized. It is even possible to utilize only very small adjustments in head position at each positioning sector, so that it initially requires the passage of several sectors to center the head on the track.

Thus, the invention provides a flexible disk drive system which enables precise positioning of a read/write head to follow a data track, despite nonuniform expansion and contraction of the disk. This is accomplished by the use of positioning sectors recorded on the disk at angularly spaced locations, where positioning tracks are recorded which can indicate the centers of the data tracks along an adjacent data region of the disk where data is recorded. Holes are formed in the disk which enable the use of optical sensors to detect the presence of the positioning sectors under the head, to prevent data entry or data readout thereat, and to permit head adjustment thereat. An adjustment circuit can be utilized to provide fine adjustments of the head position, independently of the large stepping of the head position that is employed to move the head to different tracks. The positioning sectors can be located at a uniform angle from the direction of machining of the flexible disk to minimize the adjustments that have to be made to follow a track on an expanded or contracted disk.

The novel features of the invention are set forth with particularity in the appended claims. The invention will best be understood from the following description when read in conjunction with the accompanying drawings.

I claim:

1. In a flexible disk drive system which includes a rotatable flexible disk and a disk having a read/write head mounted on a carriage to move radially along the rotating disk, the improvement wherein:
   said disk defines a plurality of narrow positioning sectors angularly spaced about the disk, and a corresponding plurality of sector-indicating holes in the disk with each hole angularly spaced by the same amount from its corresponding positioning sector, each positioning sector defining a plurality of magnetically recorded positioning tracks;
   said disk drive including optical sensor means positioned to detect said holes and head adjustment circuit means responsive to said optical sensor means and the output of said head for generating an error signal indicating the deviation of the head from a positioning track; and motor means responsive to said error signal for adjusting the radial position of said head.

2. The improvement described in claim 1 wherein:
   said disk includes a plastic substrate having a direction of machining, and said positioning sectors are each angled 0° or 90° from said direction of machining.

3. The improvement described in claim 1 wherein:
   said disk drive includes a write circuit connected to said head, and means responsive to the output of said optical sensor means for disabling said write circuit to prevent the writing of information on said disk.

4. A disk drive system including:
   a circular disk having a magnetic surface and a plurality of radially spaced concentric data tracks recorded thereon;
   means for mounting said disk for rotation about the axis thereof;
   a head for writing on or reading from said disk surface;
   head positioning means for radially moving said head along said disk surface including first means for moving said head in steps equal to multiples of a predetermined nominal spacing between adjacent data tracks;
   said disk surface having recorded thereon a plurality of positioning sectors angularly spaced around said disk axis such that they successively move into operative coupling with said head, each positioning sector having a plurality of radially spaced positioning tracks oriented such that each boundary between adjacent positioning tracks lies along the center line of one of said data tracks;
   said disk carrying a plurality of sector indicating marks, each positioned in fixed relationship with respect to a different one of said positioning sectors;
   sensor means mounted to said sense the movement of each sector indicating mark therepast to indicate the operative coupling of one of said positioning sectors with said head; and wherein
   said head positioning means includes proportional control means responsive both to said sensor means sensing a sector indicating mark and to positioning track information read by said head for adjusting the radial position of said head by a fraction of said predetermined nominal spacing.

5. The system of claim 4 wherein each sector indicating mark comprises a hole formed in said disk; and wherein
   said sensor means comprises optical means for detecting said holes.

6. The system of claim 4 including a write data means coupled to said head; and
   means responsive to said sensor means sensing a sector indicating mark for disabling said write data means.

7. The system of claim 4 including a read data output means coupled to said head; and
   means responsive to said sensor means sensing a sector indicating mark for disabling said read data output means.

8. The system of claim 4 wherein said disk is comprised of a substrate of a first material having a layer of magnetic material adhered to at least one surface thereof, said substrate material defining a primary direction of machining; and wherein
   said positioning sectors extend substantially along said direction of machining or perpendicular thereto.

* * * * *